United States Patent
Naka et al.

(10) Patent No.: US 9,029,444 B2
(45) Date of Patent: May 12, 2015

(54) DISPERSANT FOR HYDRAULIC COMPOSITION

(75) Inventors: Yoshihito Naka, Wakayama (JP);
Shuichi Fujita, Wakayama (JP);
Toshimasa Hamai, Wakayama (JP);
Daisuke Hamada, Emmerich (DE);
Keiichiro Sagawa, Wakayama (JP)

(73) Assignee: Kao Corporation, Tokyo (JP)

( * ) Notice: Subject to any disclaimer, the term of this patent is extended or adjusted under 35 U.S.C. 154(b) by 678 days.

(21) Appl. No.: 12/999,529

(22) PCT Filed: Jun. 15, 2009

(86) PCT No.: PCT/JP2009/061256
§ 371 (c)(1),
(2), (4) Date: Dec. 16, 2010

(87) PCT Pub. No.: WO2009/154286
PCT Pub. Date: Dec. 23, 2009

(65) Prior Publication Data
US 2011/0098387 A1    Apr. 28, 2011

(30) Foreign Application Priority Data
Jun. 17, 2008  (JP) ................... 2008-157319

(51) Int. Cl.
C08K 5/42 (2006.01)
C04B 24/22 (2006.01)
C04B 24/26 (2006.01)
C04B 24/30 (2006.01)
C08F 220/28 (2006.01)
C08G 10/02 (2006.01)
C08L 61/02 (2006.01)
C04B 103/40 (2006.01)
C08F 220/06 (2006.01)

(52) U.S. Cl.
CPC ........... C04B 24/226 (2013.01); C04B 24/2641 (2013.01); C04B 24/30 (2013.01); C08F 220/28 (2013.01); C08G 10/02 (2013.01); C08L 61/02 (2013.01); C04B 2103/408 (2013.01); C08F 220/06 (2013.01)

(58) Field of Classification Search
CPC .. C08B 24/226; C08B 24/2641; C08B 24/30; C08B 2103/408
USPC .................................................. 524/160, 157
See application file for complete search history.

(56) References Cited

U.S. PATENT DOCUMENTS 4,792,360 A * 12/1988 Pierce et al. ................ 524/5
4,967,834 A    11/1990 Tokizaki et al.
4,968,734 A * 11/1990 Gaidis et al. ................ 524/5

FOREIGN PATENT DOCUMENTS

| ER | 0 303 747 A2 | 2/1989 |
| JP | 60-161365 A | 8/1985 |
| JP | 1-308854 A | 12/1989 |
| JP | 8-113613 A | 5/1996 |

OTHER PUBLICATIONS

SciFinder, CAS Registry No. 36290-04-7, 2014.*
International Search report dated Jul. 28, 2009 for PCT/JP2009/061256.
English translation of International Preliminary Report on Patentability (Form PCT/IB/373) and of Written Opinion of the International Searching Authority (Form PCT/ISA/237) issued Feb. 8, 2011 in International Application No. PCT/JP2009/061256.
Machine generated English translation of JP 1-308854 A published Dec. 13, 1989.
Machine generated English translation of JP 60-161365 A published Aug. 23, 1985.

* cited by examiner

*Primary Examiner* — Wenwen Cai
(74) *Attorney, Agent, or Firm* — Birch, Stewart, Kolasch & Birch, LLP

(57) ABSTRACT

The present invention provides a dispersant for a hydraulic composition, containing (A) a polymer composed of structural units, not less than 70% by weight of which are derived from a monomer represented by the following formula (1) and (B) a naphthalenesulfonic acid-formaldehyde condensate at a weight ratio of components (A) to (B), (A)/(B), of 1/99 to 75/25:

$$H_2C=CHCOOCH_2CH_2OH \qquad (1).$$

9 Claims, No Drawings

DISPERSANT FOR HYDRAULIC COMPOSITION

FIELD OF THE INVENTION

The present invention relates to a dispersant for hydraulic compositions, a method for enhancing dispersibility of a hydraulic powder, and a hydraulic composition.

BACKGROUND OF THE INVENTION

Hydraulic compositions conventionally have been added with various admixtures. For example, to enhance flowability of a hydraulic composition, macromolecular compounds such as naphthalenesulfonic acid-formaldehyde condensates, melaminesulfonic acid-formaldehyde condensates and polycarboxylates are used. These macromolecular compounds have different characteristics and are appropriately selected to meet an intended use of a hydraulic composition. Combination use of these macromolecular compounds is also known.

For instance, JP-A60-161365 describes a cement dispersing composition that prevents a slump loss, containing a cement dispersant (e.g., naphthalenesulfonic acid-formaldehyde condensate) and a polymer of acrylic acid ester or (meth)acrylic acid ester in combination. U.S. Pat. No. 4,792,360 describes a cement composition containing a polymer of hydroxyalkyl(meth)acrylate, that has good workability and can further contain a water reducer such as sulfonated polystyrene.

SUMMARY OF THE INVENTION

The present invention relates to a dispersant for a hydraulic composition, containing (A) a polymer composed of structural units, not less than 70% by weight of which are derived from a monomer represented by the following formula (1) and (B) a naphthalenesulfonic acid-formaldehyde condensate at a weight ratio of polymer (A) to naphthalenesulfonic acid-formaldehyde condensate (B), (A)/(B), of 1/99 to 75/25:

$$H_2C=CHCOOCH_2CH_2OH \qquad (1).$$

The present invention also relates to a method for enhancing dispersibility of a hydraulic powder, including adding (A) a polymer composed of structural units, not less than 70% by weight of which are derived from a monomer represented by the following formula (1) and (B) a naphthalenesulfonic acid-formaldehyde condensate to a composition containing the hydraulic powder and water at a weight ratio of (A) polymer and (B) naphthalenesulfonic acid-formaldehyde condensate, (A)/(B), of 1/99 to 75/25 to enhance dispersibility of the hydraulic powder in the composition:

$$H_2C=CHCOOCH_2CH_2OH \qquad (1).$$

The present invention also relates to a hydraulic composition, containing the dispersant for a hydraulic composition of the present invention, a hydraulic powder and water.

DETAILED DESCRIPTION OF THE INVENTION

Dispersants used in hydraulic compositions are required to be capable of keeping good workability while adequately preventing decrease of dispersibility and increase of viscosity of hydraulic compositions over time. Although JP-A60-161365 and U.S. Pat. No. 4,792,360 have effects for enhancing workability including flowability, there is a need for more improvement. In addition, it is more preferred to provide a dispersant having good effects on keeping properties such as dispersibility and viscosity as a stable one-component product, from the point of handling ability.

The present invention provides a dispersant for hydraulic compositions that can improve workability while preventing decrease of dispersibility and increase of viscosity of a hydraulic composition over time and that is available in a product form being easy to handle.

According to the present invention, a dispersant for hydraulic compositions is provided, that can improve workability while preventing decrease of dispersibility and increase of viscosity of a hydraulic composition over time. The dispersant for hydraulic compositions of the present invention is available as a homogeneous and transparent one-component liquid composition (homogeneous solution).

<Component (A)>

The component (A) is a polymer composed of structural units, not less than 70% by weight of which is derived from a monomer represented by the formula (1) (hereinafter, referred to as the monomer (1)). The structural unit derived from the monomer (1) has the following structure:

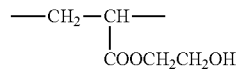

In structural units of the component (A), the structural unit is preferably not less than 75% by weight, more preferably not less than 85% by weight, and even more preferably not less than 90% by weight. Use of the component (A) containing the structural unit derived from the monomer (1) in this range together with the component (B) enables to effectively prevent decrease of dispersibility over time. When the component (A) contains a neutralized salt of an acid or base as a structural unit, a value of % by weight of the structural unit derived from the monomer (1) is calculated using a weight of the acid or base before neutralized.

A weight average molecular weight of the component (A) is preferably 1000 to 100000, more preferably 3000 to 80000, and even more preferably 5000 to 60000. The component (A) having a weight average molecular weight within the range is suitable for producing a one-component dispersant for hydraulic composition that provides an aqueous solution having low viscosity, contains an active ingredient at high concentration and is easy to handle. A weight average molecular weight of the component (A) is measured by size exclusion chromatography (GPC) using an RI detector and polystyrene as a standard substance. Conditions for the measurement are as described in Comparative Synthetic Example 1 below.

The component (A) can be produced by a known method of polymerization. From the industrial viewpoint, a completion of polymerization is preferably not less than 10% by weight. The method of polymerization may be radical polymerization, living radical polymerization, ion polymerization, or the like, and preferably radical polymerization. Any polymerization solvent can be used as long as a monomer is soluble therein. Examples of the solvent include water, methyl alcohol, ethyl alcohol, isopropyl alcohol, benzene, toluene, xylene, cyclohexane, n-hexane, ethyl acetate, acetone, and methylethylketone. Preferred are water, methyl alcohol, ethyl alcohol and isopropyl alcohol.

As a polymerization initiator, known initiators such as azo-based initiators, peroxide-based initiators, macro-initiators, and redox-based initiators can be used. For polymerization solvents containing water, examples of the polymerization initiator include ammonium salt and an alkaline metal salt of persulfuric acid, hydrogen peroxide, and water-soluble azo compounds such as 2,2'-azobis(2-amidinopropane)dihydrochloride and 2,2'-azobis(2-methylpropionamide)dihydrate. For polymerization solvents not containing water, examples of the polymerization initiator include peroxides such as benzoyl peroxide and lauroyl peroxide, and aliphatic azo compounds such as azobisisobutyronitrile.

A chain-transfer agent may further be used as a molecular weight modifier or for other purposes according to need. Examples of the chain-transfer agent include thiol-based and halogenated hydrocarbon-based chain-transfer agents. Preferred are thiol-based chain-transfer agents.

The thiol-based chain-transfer agent preferably has an —SH group. Particularly preferred is a thiol-based chain-transfer agent represented by the formula HS—R-Eg (wherein, R represents a group derived from a hydrocarbon having 1 to 4 carbon atoms; E represents —OH, —COOM, —COOR' or —SO$_3$M group; M represents a hydrogen atom, a monovalent metal, a divalent metal, an ammonium group or an organic amine group; R' represents an alkyl group having 1 to 10 carbon atoms; and g represents an integer of 1 to 2). Examples of the thiol-based chain-transfer agent include mercaptoethanol, thioglycerol, thioglycolic acid, 2-mercaptopropionic acid, 3-mercaptopropionic acid, thiomalic acid, octyl thioglycolate and octyl 3-mercaptopropionate. From the viewpoint of a chain-transfer effect in copolymerization of 1 to 3 monomers, preferred are mercaptopropionic acid and mercaptoethanol, and more preferred is mercaptopropionic acid. These may be used alone or in combination of two or more.

Examples of the halogenated hydrocarbon-based chain-transfer agent include carbon tetrachloride and carbon tetrabromide.

Examples of other chain-transfer agent include α-methylstyrene dimer, terpinolene, α-terpinene, γ-terpinene, dipentene, and 2-aminopropane-1-ol. These chain-transfer agents may be used alone or in combination of two or more.

A temperature of polymerization is not specifically limited, but preferably controlled within the range up to a boiling point of a polymerization solvent.

The component (A) may contain a structural unit derived from a monomer other than the monomer (1). Examples of the other monomer include (i) monocarboxylic acids such as (meth)acrylic acid and crotonic acid or salts thereof (e.g., alkaline metal salts, alkaline earth metal salts, ammonium salt or mono-, di-, tri-C$_{2-8}$alkyl, optionally substituted with a hydroxy group, ammonium salts) or esters (e.g., (meth)acrylate other than the monomer (1)) thereof and (ii) dicarboxylic acid monomers such as maleic acid, itaconic acid or fumaric acid, or anhydrates thereof or salts thereof (e.g., alkaline metal salts, alkaline earth metal salts, ammonium salt or mono-, di-, tri-C$_{2-8}$alkyl, optionally substituted with a hydroxy group, ammonium salts) and esters thereof. Among them, preferred are (meth)acrylic acid, maleic acid and maleic anhydride, more preferred are (meth)acrylic acid and alkaline metal salts thereof. As used herein, the "(meth) acrylic acid" refers acrylic acid and/or methacrylic acid (same to the follows).

The component (A) can be used as an aqueous solution or as a powder. A content of solids in the component (A) can be selected from 1 to 100% by weight, but preferably 20 to 100% by weight, and more preferably 30 to 100% by weight, from the point of producing the dispersant of the present invention by mixing the component (A) with the component (B). When the component (A) is prepared as an aqueous solution, a content of solids in the component (A) is preferably 10 to 70% by weight, more preferably 15 to 60% by weight, and even more preferably 20 to 50% by weight.

A content of solids in a solution can be calculated from a difference of a sample weight before and after drying about 3 g of sample in an aluminium foil cup for 2 hours at 105° C.

<Component (B)>

The component (B) is a naphthalenesulfonic acid-formaldehyde condensate, and preferably has a weight average molecular weight of not more than 200000, more preferably not more than 100000, even more preferably not more than 80000, and even more preferably not more than 50000. The weight average molecular weight is also preferably not less than 1000, more preferably not less than 3000, even more preferably not less than 4000, and even more preferably not less than 5000. The weight average molecular weight is accordingly preferably 1000 to 200000, more preferably 3000 to 100000, even more preferably 4000 to 80000, and even more preferably 5000 to 50000. The naphthalenesulfonic acid-formaldehyde condensate of the component (B) may be in the form of acid or neutralized.

Examples of a method of production of naphthalenesulfonic acid-formaldehyde condensate include condensation of naphthalenesulfonic acid with formaldehyde. The resultant condensate may be neutralized. Water-insoluble bi-products generated by neutralization may be removed. A specific process of the method is as follows. To produce naphthalenesulfonic acid, 1 mol of naphthalene is reacted with 1.2 to 1.4 mol of sulfuric acid for 2 to 5 hours at 150 to 165° C. to give a sulfonated product. To 1 mol of the sulfonated product is added formalin in an amount equivalent to 0.95 to 0.99 mol of formaldehyde dropwise for 3 to 6 hours at 85 to 95° C., and then condensated at 95 to 105° C. A neutralizing step may be then performed by adding water and a neutralizing agent to the condensate and reacting at 80 to 95° C. The neutralizing agent is preferably added in 1.0 to 1.1 times the molar amount to each of naphthalenesulfonic acid and unreacted sulfuric acid. Water insoluble matters generated by neutralization may be removed, preferably by filtration. Through these steps, an aqueous solution of water-soluble salt of naphthalenesulfonic acid-formaldehyde condensate is obtained. The aqueous solution can be used as the component (B) as is or by being added with other ingredients appropriately. A content of solid in the aqueous solution as the component (B) is, which may be varied according to applications, preferably 0.3 to 50% by weight, more preferably 5 to 45% by weight, and even more preferably 30 to 45% by weight, from the viewpoints of properties for dispersing a hydraulic powder and ease of handling depending on an adequate viscosity of the aqueous solution. The aqueous solution may further be dried and powderized to give a powder of water-soluble salt of naphthalenesulfonic acid-formaldehyde condensate according to need. The powder may be used as the powdery component (B). Drying and powderizing can be carried out by spray-drying, drum drying, freeze drying, or the like.

<Dispersant for Hydraulic Compositions>

In the dispersant for a hydraulic composition of the present invention, a weight ratio of the components (A) to (B) for solid contents is (A)/(B)=1/99 to 75/25. From the viewpoints of mixing performance of the components (A) and (B) and dispersibility for the hydraulic composition, the weight ratio is preferably 1/99 to 50/50, more preferably 1/99 to 45/55, and even more preferably 1/99 to 30/70. From the viewpoint of prevention of decreasing dispersibility for the hydraulic composition over time, or retention of dispersion, the weight ratio is more preferably 5/95 to 40/60, and even more preferably 5/95 to 30/70. The weight ratio within the range is preferred from the viewpoints of dispersibility, retention of dispersion, and production of a one-component preparation that is a homogeneous aqueous solution, has a controlled viscosity, and is easy to handle. It is expected reasons for a good dispersibility and a good retention of dispersion that the component (B) contributes an initial dispersibility and then the component (A) exhibits a synergistic effect on dispersibility with the component (B), even if the amount of the component (A) alone is insufficient to result in a good retention of dispersion. It is also thought that interaction between the components (A) and (B) is weak in an aqueous solution, and thus an aqueous solution containing both components has a controlled viscosity. In contrast, a mixture of the component (B) and a polymer having a graft chain of polyalkylene oxide has increased viscosity. This may be due to interaction between them.

When the component (A) contains the structural unit derived from the monomer represented by the formula (1) in an amount of not less than 80% by weight, (A)/(B) is preferably 1/99 to 45/55, when not less than 85% by weight, (A)/(B) is preferably 1/99 to 50/50, and when not less than 90% by weight, (A)/(B) is preferably 1/99 to 75/25.

For the dispersant for hydraulic compositions of the present invention, from the viewpoints of ease of handling and productivity (ease of production) of the dispersant, an aqueous solution thereof containing 20% by weight of solids preferably has a viscosity of not more than 60 mPa·s, more preferably not more than 50 mPa·s, even more preferably not more than 40 mPa·s, and even more preferably not more than 20 mPa·s at 25° C. The aqueous solution also preferably has a viscosity of not less than 1 mPa·s. From the viewpoints of ease of handling and productivity (ease of production) of the dispersant, an aqueous solution thereof containing 41% by weight of solids preferably has a viscosity of not more than 1500 mPa·s, more preferably not more than 1000 mPa·s, even more preferably not more than 750 mPa·s, and even more preferably not more than 300 mPa·s at 25° C. The aqueous solution also preferably has a viscosity of not less than 1 mPa·s. To produce an aqueous solution having a viscosity within this range, a polymer having a weight average molecular weight within the range described above is preferably used as the component (A). The viscosity of the aqueous solution is measured according to the method described in Examples below.

The dispersant for hydraulic compositions of the present invention may be in the form of solid such as powder and granule, liquid, paste, or the like. Among these forms, the liquid form is preferred because the dispersant can be prepared as a one-component preparation. In this case, the dispersant is preferably a solution, more preferably, an aqueous solution containing the components (A) and (B). In the case of aqueous solution, the dispersant for hydraulic compositions of the present invention preferably contains the component (A) in an amount of 0.1 to 50% by weight, and more preferably 3 to 20% by weight, and preferably contains the component (B) in an amount of 0.3 to 50% by weight, and more preferably 5 to 45% by weight. The dispersant for hydraulic compositions of the present invention preferably contains water and is in the form of homogeneous solution (homogeneous aqueous solution) at 25° C. As used herein, the "homogeneous solution" refers a state that the component (A) is not separated (precipitated). In addition, from the viewpoint of storage stability, the aqueous solution is more preferably not cloudy. In the case of aqueous solution, the dispersant for hydraulic compositions of the present invention preferably contains water in an amount of 40 to 70% by weight, and more preferably 50 to 65% by weight. In the case of aqueous solution, a total amount of components (A) and (B) in the dispersant for hydraulic compositions of the present invention is preferably 30 to 60% by weight, and more preferably 35 to 50% by weight. In the case of aqueous solution, the dispersant can contain liquid ingredients other than water such as an organic solvent.

The dispersant for hydraulic compositions of the present invention may further contain known agents such as a dispersant, an air entraining agent (AE agent), a defoamant, a fluidizing agent, a thickener, a high-early-strength agent, and a retarder, according to need.

<Hydraulic Composition>

The hydraulic composition of the present invention contains the dispersant for hydraulic compositions of the present invention, a hydraulic powder and water.

The hydraulic powder used in the hydraulic composition of the present invention is a powdery material having properties of curing by hydration. Examples thereof include cements and gypsum. The hydraulic powder may be preferably a cement such as an ordinary Portland cement, a belite cement, a moderate-heat cement, a high-early strength cement, an ultra high-early strength cement and a sulfate-resisting cement, or a mixture of these cement with blast furnace slag, fly ash, silica fume, stone powder (calcium carbonate powder) and the like. The hydraulic composition of the present invention may further contain aggregates. In general, final hydraulic compositions obtained by mixing such a powder with aggregates such as sand and sand-and-gravel are so-called mortar and concrete. The hydraulic composition of the present invention is useful in any type of concretes including ready-mixed concrete, vibration compaction concrete, self leveling concrete, refractory concrete, concrete for plaster, gypsum slurry concrete, light or heavy concrete, AE concrete, concrete for repairing, prepacked concrete, concrete for tremie, concrete for grout, concrete for soil improvement, and concrete for cold weather.

In the hydraulic composition of the present invention, a ratio of water/hydraulic powder (a ratio of water to the hydraulic powder by weight percentage (% by weight) in slurry, generally abbreviated to W/P, and also W/C in cases that the powder is cement) can be 5 to 500% by weight, preferably 10 to 200% by weight, and more preferably 10 to 100% by weight.

The hydraulic composition preferably contains the dispersant for hydraulic compositions of the present invention in such amount as that a ratio of a total of components (A) and (B) to the hydraulic powder is 0.001 to 10 parts by weight, more preferably 0.01 to 5 parts by weight, and even more preferably 0.05 to 1 part by weight to 100 parts by weight (based on solid content). In addition, the component (A) is preferably contained at a ratio (based on solid content) of 0.0005 to 4.5 parts by weight, and more preferably 0.005 to 2.25 parts by weight to 100 parts by weight of the hydraulic powder. The component (B) is preferably contained at a ratio (based on solid content) of 0.0055 to 9.5 parts by weight, and more preferably 0.0055 to 4.75 parts by weight to 100 parts by weight of the hydraulic powder.

In general, a dispersant for hydraulic compositions is used as a liquid composition (preferably an aqueous solution) of active ingredients with water in advance to adding to a hydraulic composition. In some cases, such a liquid composition has increased viscosity. In the present invention, since the liquid composition containing components (A) and (B) does not increases its viscosity and is in a homogeneous state, it is easy to handle and can be used to produce fresh concrete having good workability.

Addition of components (A) and (B) according to the present invention to a composition containing a hydraulic powder and water increases dispersibility of the hydraulic powder in the composition and prevents decrease of dispersibility and increase of viscosity, resulting in a hydraulic composition having good workability with less decreasing dispersibility over time. Components (A) and (B) may be mixed and then added to a composition containing a hydraulic powder and water, or may be separately added to the composition. In cases of separately adding components (A) and (B), components (A) and (B) preferably satisfy the weight ratio condition described above, from the points of dispersibility in the hydraulic composition and prevention of decrease of the dispersibility over time.

EXAMPLES

Following Examples demonstrate the present invention. Examples are intended to illustrate the present invention, and not to limit the present invention.
[Component (A)]
For the component (A) and comparative polymers, polymers of Synthesis Examples and Comparative Synthesis Examples below were used.
<Starting Materials for Synthesis>
  hydroxyethyl acrylate: Aldrich (effective amount: 96%) [monomer (1)]
  acrylic acid: Aldrich (effective amount: 99%)
  methyl acrylate: Wako Pure Chemical Industries, Ltd. (effective amount: 98%)
  ethyl acrylate: Wako Pure Chemical Industries, Ltd. (effective amount: 97%)
  sodium methallyl sulfonate: Wako Pure Chemical Industries, Ltd. (effective amount: 98%)
  mercaptopropionic acid: Aldrich
  ammonium peroxodisulfate: Wako Pure Chemical Industries, Ltd.
  V-65: 2,2'-azobis(2,4-dimethylvaleronitrile), Wako Pure Chemical Industries, Ltd.

SYNTHESIS EXAMPLES

Comparative Synthesis Example 1

A four-neck flask containing 82.5 g of ion-exchanged water was vacuumed and filled with nitrogen to be used as a reaction container. 33.4 g of acrylic acid (hereinafter, referred to as AA) was mixed with 69.7 g of hydroxyethyl acrylate (hereinafter, referred to as HEA) to prepare a monomer liquid. 1.42 g of ammonium peroxodisulfate was dissolved in 28.3 g of ion-exchanged water to prepare an aqueous initiator solution (1). 2.2 g of 3-mercaptopropionic acid was dissolved in 25 g of ion-exchanged water to prepare an aqueous solution of chain-transfer agent. The reaction container was heat to 80° C. To this were added the monomer mixture, the aqueous initiator solution (1) and the aqueous solution of chain-transfer agent, simultaneously dropwise over 90 minutes. To this was added an aqueous initiator solution (2), which was previously prepared by dissolving 0.4 g of ammonium peroxodisulfate in 7.1 g of ion-exchanged water, dropwise over 30 minutes. The mixture was further reacted for 60 minutes at 80° C. Then, the product mixture was cooled to room temperature after the reaction had finished, and neutralized with an aqueous 48% sodium hydroxide solution to obtain an aqueous solution of a polymer a-1. A solid content and a pH of the obtained solution were 41% by weight and pH 5, respectively.

Ratio Of Ingredients Used:
  AA/HEA=32.4/67.6 (weight ratio) (HEA 67.6% by weight)
  AA/HEA=43.6/56.4 (molar ratio)
  weight average molecular weight: 45300
  AA: reaction rate 98% (HPLC)
  HEA: reaction rate 99% (HPLC)
  A molecular weight was measured under the GPC conditions as follows.
[GPC Condition]
  standard substance: polystyrene
  column: G4000PWXL+G2500PWXL (Tosoh Corporation)
  eluent: 0.2M phosphate buffer/acetonitrile=9/1
  flow rate: 1.0 mL/min
  column temperature: 40° C.
  detector: RI Comparative Synthesis Example 2

158.5 g of isopropyl alcohol (hereinafter, referred to as IPA) was placed in a four-neck flask as a reaction container. A monomer liquid of 66.7 g of methyl acrylate was prepared. 1.2 g of V-65 was mixed with 38.1 g of IPA to prepare an initiator solution (1). 0.8 g of 3-mercaptopropionic acid was mixed with 25 g of IPA to prepare a chain-transfer agent solution. The reaction container was heated to 70° C. To this were added the monomer solution, the initiator solution (1) and the chain-transfer agent solution, simultaneously dropwise over 60 minutes. To this was added an initiator solution (2), which was previously prepared by mixing 0.3 g of V-65 with 15 g of IPA, dropwise over 30 minutes. The mixture was further reacted for 30 minutes at 70° C. From the resultant mixture, a polymer precipitated at room temperature to turn the mixture cloudy. To the mixture was added acetone to give a homogeneous mixture. The solvent was removed to give a polymer a-2.
  ratio of ingredients used: methyl acrylate 100% by mol
  weight average molecular weight: 4100
  methyl acrylate: reaction rate 94% (H-NMR)
  A molecular weight was measured under the GPC conditions as follows.
[GPC Condition]
  standard substance: polystyrene
  column: K804L+K804L
  eluent: 1 mmol/L Farmin DM20 (Kao Corporation: dimethyllaurylamine)/methyl chloride
  flow rate:1.0 ml/min
  column temperature: 40° C.
  detector: RI Comparative Synthesis Example 3

59 g of IPA was placed in a four-neck flask as a reaction container. A monomer liquid of 25 g of ethyl acrylate was prepared. 0.43 g of V-65 was mixed with 20 g of IPA to prepare an initiator solution (1). 0.31 g of 3-mercaptopropionic acid was mixed with 10 g of IPA to prepare a chain-transfer agent liquid. The reaction container was heated to 70° C. To this were added the monomer liquid, the initiator solution (1) and the chain-transfer agent liquid, simultaneously dropwise over 60 minutes. To this was added an initiator solution (2), which was previously prepared by mixing 0.3 g of V-65 with 15 g of IPA, dropwise over 30 minutes. The mixture was further reacted for 30 minutes at 70° C. The solvent was removed to give a polymer a-3.

Ratio Of Ingredients Used: Ethyl Acrylate 100% By Mol
  weight average molecular weight: 1200
  ethyl acrylate: reaction rate 91% (H-NMR)
  GPC measurement conditions were same to that of Comparative Synthesis Example 2.

Comparative Synthesis Example 4

A four-neck flask containing 79.2 g of ion-exchanged water was vacuumed and filled with nitrogen to be used as a reaction container. 53.2 g of AA was mixed 49.3 g of HEA to prepare a monomer liquid. 1.56 g of ammonium peroxodisulfate was dissolved in 31.2 g of ion-exchanged water to prepare an aqueous initiator solution (1). 2.42 g of 3-mercaptopropionic acid was dissolved in 25 g of ion-exchanged water to prepare an aqueous solution of chain-transfer agent. The reaction container was heat to 80° C. To this were added the monomer liquid, the aqueous initiator solution (1) and the aqueous solution of chain-transfer agent, simultaneously dropwise over 90 minutes. To this was added an aqueous initiator solution, which was previously prepared by dissolving 0.4 g of ammonium peroxodisulfate in 7.8 g of ion-exchanged water, dropwise over 30 minutes. The mixture was further reacted for 60 minutes at 80° C. Then, the mixture was cooled to room temperature, and neutralized with aqueous 48% sodium hydroxide to give an aqueous solution of a polymer a-4. A solid content and a pH of the obtained solution were 46% by weight and pH 5, respectively.
Ratio Of Ingredients Used:
  AA/HEA=52.7/47.3 (weight ratio) (HEA 47.3% by weight)
  AA/HEA=64.2/35.8 (molar ratio)
  weight average molecular weight: 45000
  AA: reaction rate 97% (HPLC)
  HEA: reaction rate 98% (HPLC)
  GPC measurement conditions were same to that of Comparative Synthesis Example 1.

Synthesis Example 1

A four-neck flask containing 84 g of ion-exchanged water was vacuumed and filled with nitrogen to be used as a reaction container. 24.4 g of AA was mixed with 79.1 g HEA to prepare a monomer liquid. 1.4 g of ammonium peroxodisulfate was dissolved in 27.1 g of ion-exchanged water to prepare an aqueous initiator solution (1). 2.1 g of 3-mercaptopropionic acid was dissolved in 25 g of ion-exchanged water to prepare an aqueous solution of chain-transfer agent. The reaction container was heat to 80° C. To this were added the monomer liquid, the aqueous initiator solution and the aqueous solution of chain-transfer agent, simultaneously dropwise over 90 minutes. To this was added an aqueous initiator solution (2), which was previously prepared by dissolving 0.3 g of ammonium peroxodisulfate in 6.8 g of ion-exchanged water, dropwise over 30 minutes. The mixture was further reacted for 60 minutes at 80° C. Then, the mixture was cooled to room temperature, and neutralized with aqueous 48% sodium hydroxide to give an aqueous solution of a polymer A-1. A solid content and a pH of the obtained solution were 41% by weight and pH 5, respectively.
Ratio Of Ingredients Used:
  AA/HEA=23.6/76.4 (weight ratio) (HEA76.4% by weight)
  AA/HEA=33.2/66.8 (molar ratio)
  weight average molecular weight: 39900
  AA: reaction rate 98% (HPLC)
  HEA: reaction rate 99% (HPLC)
  GPC measurement conditions were same to that of Comparative Synthesis Example 1.

Synthesis Example 2

A four-neck flask containing 84.2 g of ion-exchanged water was vacuumed and filled with nitrogen to be used as a reaction container. 20.2 g of AA was mixed with 83.5 g of HEA to prepare a monomer liquid. 1.3 g of ammonium peroxodisulfate was dissolved in 26.4 g of ion-exchanged water to prepare an aqueous initiator solution (1). 2.6 g of 3-mercaptopropionic acid was dissolved in 25 g of ion-exchanged water to prepare an aqueous solution of chain-transfer agent. The reaction container was heat to 80° C. To this were added the monomer liquid, the aqueous initiator solution (1) and the aqueous solution of chain-transfer agent, simultaneously dropwise over 90 minutes. To this was added an aqueous initiator solution (2), which was previously prepared by dissolving 0.3 g of ammonium peroxodisulfate in 6.6 g of ion-exchanged water, dropwise over 30 minutes. The mixture was further reacted for 60 minutes at 80° C. Then, the mixture was cooled to room temperature, and neutralized with aqueous 48% sodium hydroxide to give an aqueous solution of a polymer A-2. A solid content and pH of the obtained solution were 43% by weight and pH 5, respectively.
Ratio Of Ingredients Used:
  AA/HEA=19.5/80.5 (weight ratio) (HEA80.5% by weight)
  AA/HEA=28.0/72.0 (molar ratio)
  weight average molecular weight: 34500
  AA: reaction rate 97% (HPLC)
  HEA: reaction rate 98% (HPLC)
  GPC measurement conditions were same to that of Comparative Synthesis Example 1.

Synthesis Example 3

A four-neck flask containing 85.6 g of ion-exchanged water was vacuumed and filled with nitrogen to be used as a reaction container. 11.7 g of AA was mixed with 92.1 g of HEA to prepare a monomer liquid. 1.3 g of ammonium peroxodisulfate was dissolved in 25.2 g of ion-exchanged water to prepare an aqueous initiator solution (1). 2.5 g of 3-mercaptopropionic acid was dissolved in 25 g of ion-exchanged water to prepare an aqueous solution of chain-transfer agent. The reaction container was heat to 80° C. To this were added the monomer liquid, the aqueous initiator solution (1) and the aqueous solution of chain-transfer agent, simultaneously dropwise over 90 minutes. To this was added an aqueous initiator solution (2), which was previously prepared by dissolving 0.3 g of ammonium peroxodisulfate in 6.3 g of ion-exchanged water, dropwise over 30 minutes. The mixture was further reacted for 60 minutes at 80° C. Then, the mixture was cooled to room temperature, and neutralized with aqueous 48% sodium hydroxide to give an aqueous solution of a polymer A-3. A solid content and a pH of the obtained solution were 41% by weight and pH 5, respectively.
Ratio of Ingredients Used:
  AA/HEA=11.3/88.7 (weight ratio) (HEA88.7% by weight)
  AA/HEA=17.0/83.0 (molar ratio)
  weight average molecular weight: 30600
  AA: reaction rate 97% (HPLC)
  HEA: reaction rate 98% (HPLC)
  GPC measurement conditions were same to that of Comparative Synthesis Example 1.

Synthesis Example 4

A four-neck flask containing 224.5 g of ion-exchanged water was vacuumed and filled with nitrogen to be used as a reaction container. 4.4 g of ammonium peroxodisulfate was dissolved in 90 g of ion-exchanged water to prepare an aqueous initiator solution (1). 10.2 g of 3-mercaptopropionic acid was dissolved in 80 g of ion-exchanged water to prepare an aqueous solution of chain-transfer agent. The reaction container was heat to 80° C. To this were added a monomer liquid of 280 g of HEA, the aqueous initiator solution (1) and the aqueous solution of chain-transfer agent, simultaneously dropwise over 90 minutes. To this was added an aqueous initiator solution (2), which was previously prepared by dissolving 0.6 g of ammonium peroxodisulfate in 10 g of ion-exchanged water, dropwise over 30 minutes. The mixture was further reacted for 60 minutes at 80° C. Then, the mixture was cooled to room temperature, and neutralized with aqueous 48% sodium hydroxide to give an aqueous solution of a polymer A-4. A solid content and a pH of the obtained solution were 41% by weight and pH 5, respectively.

ratio of ingredients used: HEA 100% by mol (100% by weight)
weight average molecular weight: 14200
HEA: reaction rate 96% (HPLC)
GPC measurement conditions were same to that of Comparative Synthesis Example 1.

Synthesis Example 5

A four-neck flask containing 76.6 g of ion-exchanged water was vacuumed and filled with nitrogen to be used as a reaction container. 1.6 g of V-50 was dissolved in 31 g of ion-exchanged water to prepare an aqueous initiator solution (1). 12.5 g of sodium methallyl sulfonate was dissolved in 30 g of ion-exchanged water to prepare a monomer liquid (1). The reaction container was heat to 80° C. To this were added a monomer liquid (2) of 94 g of HEA, the aqueous initiator solution (1) and the monomer liquid (1), simultaneously dropwise over 90 minutes. To this was added an aqueous initiator solution (2), which was previously prepared by dissolving 0.2 g of V-50 in 4 g of ion-exchanged water, dropwise over 30 minutes. The mixture was further reacted for 60 minutes at 80° C. Then, the mixture was cooled to room temperature to give an aqueous solution of a polymer A-5. A solid content of the obtained solution was 42% by weight.

Ratio of Ingredients Used:
sodium methallyl sulfonate/HEA=12.0/88.0 (weight ratio) (HEA 88.0% by weight)
sodium methallyl sulfonate/HEA=10.4/89.6 (molar ratio)
weight average molecular weight: 53100
HEA: reaction rate 99% (HPLC)
sodium methallyl sulfonate: reaction rate 98% (HPLC)
GPC measurement conditions were same to that of Comparative Synthesis Example 1.

Synthesis Example 6

A four-neck flask containing 75.9 g of ion-exchanged water was vacuumed and filled with nitrogen to be used as a reaction container. 1.6 g of V-50 was dissolved in 31 g of ion-exchanged water to prepare an aqueous initiator solution (1). 6.8 g of sodium methallyl sulfonate was dissolved in 30 g of ion-exchanged water to prepare a monomer liquid (1). The reaction container was heat to 80° C. To this were added a monomer liquid (2) of 100 g of HEA, the aqueous initiator solution (1) and the monomer liquid (1), simultaneously dropwise over 90 minutes. To this was added an aqueous initiator solution (2), which was previously prepared by dissolving 0.2 g of V-50 in 4 g of ion-exchanged water, dropwise over 30 minutes. The mixture was further reacted for 60 minutes at 80° C. Then, the mixture was cooled to room temperature to give an aqueous solution of a polymer A-6. A solid content of the solution was 42% by weight.

Ratio of Ingredients Used:
sodium methallyl sulfonate/HEA=6.5/93.5 (weight ratio) (HEA93.5% by weight)
sodium methallyl sulfonate/HEA=5.6/94.4 (molar ratio)
weight average molecular weight: 66200
sodium methallyl sulfonate: reaction rate 97% (HPLC)
HEA: reaction rate 99% (HPLC)
GPC measurement conditions were same to that of Comparative Synthesis Example 1.

[Component (B)]

The naphthalenesulfonic acid-formaldehyde condensate (B-1) prepared in Synthesis Example B-1 was used as the component (B).

Synthesis Example B-1

1 mol of naphthalene (128.2 g) was reacted with 1.28 mol of sulfuric acid (125.5 g) for 3 hours at 150° C. to 160° C. To the product (sulfonate) were added 44 g of water, and formalin (37% formaldehyde in water) in such amount as equal to 0.98 mol of formaldehyde dropwise over 3 hours at 90° C. The mixture was reacted for condensation for 10 hours at 100±2° C. The mixture was cooled to room temperature, neutralized to pH 5 with calcium hydroxide, and filtrated to remove generated precipitates (gypsum), resulting in an aqueous solution of a naphthalenesulfonic acid-formaldehyde condensate (B-1). The polymer was dried for 24 hours at 105° C. The aqueous solution was adjusted to an intended concentration to be used according to need.

weight average molecular weight: 13000

A molecular weight was measured under the GPC conditions as follows.

[GPC Measurement Condition]
column: G4000SW$_{XL}$+G2000SW$_{XL}$
eluent: 30 mM sodium acetate/acetonitrile=6/4 vol %
flow rate: 0.7 ml/min
detector: UV 280 mm
column temperature: 25° C.
<Column Pretreatment>
coating liquid: 30 mM sodium acetate/acetonitrile=6/4 vol %, containing 0.5% of naphthalenesulfonic acid-based dispersant (Kao Corporation, Mighty 100)
flow rate: 0.2 ml/min
time: 72 hours

[Other Polymers]
PAA: polyacrylic acid sodium salt, Kao Corporation, trade name OligomerD (weight average molecular weight: 8000, solid content: 40% by weight)
PSS: polystyrenesulfonic acid sodium salt, Tosoh Organic Chemical Co., Ltd., trade name Poly-NaSS PS-1 (weight average molecular weight $1 \times 10^4$ to $3 \times 10^4$, solid content: 21% by weight)

Example 1

Mortar Flow

In a universal mixer (model: 5DM-03-r, Dalton Corporation), 400 g of cement (Taiheiyo Cement Corporation/Sumitomo Osaka Cement Co., Ltd=1:1 (weight ratio); density=3.16 g/cm$^3$) and 700 g of pit sand (area: Joyo, density=2.55 g/cm$^3$) were stirred for 10 second at a low speed setting. Then, 160 g of aqueous dispersant solution, which was previously prepared, was added to the mixture (start of contacting with water) and stirred for 90 seconds at a low speed. The resultant mortar was filled in a cone (lower opening diameter: 100 mm, upper opening diameter: 70 mm, height: 60 mm) and measured for mortar flow (immediately after the contact). Mortar flows 30, 60 and 90 after contacting with water were similarly measured. This Example was performed for evaluating dispersibility over time. The results are shown in Table 1. In Table 1, some ingredient not corresponding to the component (A) was shown in a column of the component (A) for convenience.

160 g of aqueous dispersant solution contains the dispersant in such amount as that solid contents of respective components in the dispersant were as shown by parts by weight in Table 1 to 100 parts by weight of cement, 0.05 g of defoaming agent and the residual part of water. A solid content was determined as follows: placing about 3 g of sample solution in an aluminium foil cup, weighing it, drying it for 2 hours at 105° C., weighing it again, and calculating a solid concentration in the solution from a difference of weight. In other Examples, a solid content was similarly determined. It is preferable that a mortar flow has a small change from an initial value for a certain period.

density=2.55 g/cm³) were stirred for 10 second at a low speed setting. Then, to this was added 320 g of aqueous dispersant solution, which was previously prepared, and stirred for 90 seconds at a low speed. The resultant mortar was filled in a cone (lower opening diameter: 100 mm, upper opening diameter: 70 mm, height: 60 mm) and measured for mortar flow (immediately after contacting with water). Mortar flows 30 and 60 minutes after contacting with water were similarly measured. Upon measuring mortar flows at initial time and 30 minutes after, the mortar was also filled in a J-funnel (upper opening diameter: 70 mm, lower opening diameter: 15 mm, height: 390 mm) for measuring a flow down time. This Example was performed for evaluating dispersibility and viscosity over time. The results are shown in Tables 2 and 3. In Tables 2 and 3, some ingredient not corresponding to the components (A) and (B) were shown in columns of the components (A) and (B) for convenience.

TABLE 1

| | | | Dispersant for hydraulic compositions | | | | | |
|---|---|---|---|---|---|---|---|---|
| | | | Compounded component | | Dosage (parts by weight) | | | Weight ratio | |
| | | | Component (A) | Component (B) | Component (A) | Component (B) | Total | Component (A) | Component (B) |
| Comparative product | 1-1 | — | B-1 | 0.000 | 0.440 | 0.440 | 0 | 100 |
| | 1-2 | a-1 | B-1 | 0.120 | 0.440 | 0.560 | 21.4 | 78.6 |
| Present invention product | 1-1 | A-1 | B-1 | 0.120 | 0.440 | 0.560 | 21.4 | 78.6 |
| | 1-2 | A-3 | B-1 | 0.120 | 0.440 | 0.560 | 21.4 | 78.6 |
| | 1-3 | A-4 | B-1 | 0.120 | 0.440 | 0.560 | 21.4 | 78.6 |

| | | | Mortar flow (mm) | | | |
|---|---|---|---|---|---|---|
| | | | immediately after | 30 minutes after | 60 minutes after | 90 minutes after |
| Comparative product | 1-1 | | 215 | 135 | 118 | — |
| | 1-2 | | 296 | 130 | 113 | — |
| Present invention product | 1-1 | | 248 | 277 | 250 | 189 |
| | 1-2 | | 213 | 250 | 296 | 279 |
| | 1-3 | | 214 | 200 | 225 | 230 |

Example 2

Mortar Flow and J-Funnel Flow-Down Time

In a universal mixer (model: 5DM-03-r, Dalton Corporation), 800 g of cement (Taiheiyo Cement Corporation/Sumitomo Osaka Cement Co., Ltd=1:1 (weight ratio); density=3.16 g/cm³) and 1400 g of pit sand (area: Joyo, 320 g of aqueous dispersant solution contains the dispersant in such amount as that solid contents of respective components in the dispersant were as shown by parts by weight in Table 2 or 3 to 100 parts by weight of cement, 0.1 g of defoaming agent and the residual part of water.

TABLE 2

| | | | Dispersant for hydraulic composition | | | | | |
|---|---|---|---|---|---|---|---|---|
| | | | Compounded component | | Dosage (parts by weight) | | | Weight ratio | |
| | | | Component (A) | Component (B) | Component (A) | Component (B) | Total | Component (A) | Component (B) |
| Present invention product | 2-1 | A-1 | B-1 | 0.188 | 0.440 | 0.628 | 29.9 | 70.1 |
| Comparative product | 2-1 | a-1 | B-1 | 0.188 | 0.440 | 0.628 | 29.9 | 70.1 |
| Comparative product | 2-2 | a-3 | B-1 | 0.188 | 0.440 | 0.628 | 29.9 | 70.1 |

| | | | Mortar flow (mm) | | | J-funnel flow-down time (second) | |
|---|---|---|---|---|---|---|---|
| | | | Immediately after | 30 minutes after | 60 minutes after | Immediately after | 30 minutes after |
| Present invention product | 2-1 | | 210 | 303 | 314 | 16.09 | 13.30 |

TABLE 2-continued

|  |  |  |  |  |  |  |
|---|---|---|---|---|---|---|
| Comparative product | 2-1 | 212 | 162 | 140 | 16.01 | 28.50 |
| Comparative product | 2-2 | 208 | 134 | 116 | 16.14 | — |

TABLE 3

| | | Dispersant for hydraulic composition | | | | | |
|---|---|---|---|---|---|---|---|
| | | Compounded component | | Dosage (weight part) | | | Weight ratio | |
| | | Component (A) | Component (B) | Component (A) | Component (B) | Total | Component (A) | Component (B) |
| Present invention product | 2-2 | A-2 | B-1 | 0.030 | 0.440 | 0.470 | 6.4 | 93.6 |
| | 2-3 | A-2 | B-1 | 0.035 | 0.440 | 0.475 | 7.4 | 92.6 |
| | 2-4 | A-2 | B-1 | 0.040 | 0.440 | 0.480 | 8.3 | 91.7 |
| | 2-5 | A-2 | B-1 | 0.050 | 0.440 | 0.490 | 10.2 | 89.8 |
| | 2-6 | A-4 | B-1 | 0.080 | 0.440 | 0.520 | 15.4 | 84.6 |
| Comparative product | 2-3 | — | PSS | 0.000 | 0.683 | 0.683 | 0.0 | 100.0 |
| | 2-4 | A-4 | PSS | 0.060 | 0.683 | 0.743 | 8.1 | 91.9 |
| | 2-5 | A-4 | PSS | 0.300 | 0.683 | 0.983 | 30.5 | 69.5 |
| | 2-6 | — | B-1 | 0.000 | 0.440 | 0.440 | 0.0 | 100.0 |
| | 2-7 | A-2 | — | 0.030 | 0.000 | 0.030 | 100 | 0.0 |
| | 2-8 | a-2 | B-1 | 0.188 | 0.400 | 0.628 | 29.9 | 70.1 |
| | 2-9 | — | PAA | 0.000 | 0.488 | 0.488 | 0.0 | 100.0 |
| | 2-10 | A-4 | PAA | 0.400 | 0.488 | 0.888 | 45.0 | 55.0 |

| | | Mortar flow (mm) | | | J-funnel flow-down time (second) | |
|---|---|---|---|---|---|---|
| | | Immediately after | 30 minutes after | 60 minutes after | Immediately after | 30 minutes after |
| Present invention product | 2-2 | 215 | 155 | 140 | 16.01 | 24.00 |
| | 2-3 | 214 | 163 | 140 | 16.04 | 20.40 |
| | 2-4 | 217 | 178 | 160 | 15.91 | 17.06 |
| | 2-5 | 215 | 199 | 175 | 15.93 | 16.64 |
| | 2-6 | 214 | 170 | 165 | 15.99 | 18.27 |
| Comparative product | 2-3 | 210 | 151 | 146 | 16.39 | 28.44 |
| | 2-4 | 210 | 150 | 145 | 16.45 | 29.12 |
| | 2-5 | 216 | 172 | 210 | 16.11 | 25.55 |
| | 2-6 | 215 | 136 | 119 | 15.89 | — |
| | 2-7 | 107 | 106 | 108 | — | — |
| | 2-8 | 212 | 162 | 140 | 16.01 | 28.50 |
| | 2-9 | 211 | 115 | 105 | 16.50 | — |
| | 2-10 | 209 | 173 | 145 | 16.61 | 31.36 |

Comparative products 2-2, 2-6 and 2-9 had too low mortar flows 30 minutes after to be measured for a J-funnel flow-down time 30 minutes after. Comparative product 2-7 had too low mortar flow at immediately after to be measured for a J-funnel flow-down time. A mortar flow preferably changes small from an initial value for a certain period. A J-funnel flow-down time value is preferably small, from the point of viscosity of hydraulic composition.

Example 3

Viscosity of a Dispersant

Aqueous dispersant solutions shown in Table 4 were measured for viscosity with a Viscometric TVB-10 (Toki Sangyo Co., Ltd.) in cases of solid concentrations of 20% by weight and 41% by weight. Respective measurement conditions are as follows. The results are shown in Table 4. From the viewpoint of ease of handling a dispersant in production and in use, a viscosity is preferably low.

(1) viscosity of an aqueous solution containing 20% by weight of solids measurement conditions: rotor BL, rotation number: 3 rpm, measurement time: 2 min, measurement temperature: 25° C.

(2) viscosity of an aqueous solution containing 41% by weight of solids measurement conditions: rotor BL, rotation number: 0.3 rpm, measurement time: 7 min, measurement temperature: 25° C.

TABLE 4

| | | Dispersant for hydraulic composition | | | | | |
|---|---|---|---|---|---|---|---|
| | | Compounded component | | Weight ratio | | Viscosity of aqueous solution (mPa·S) | |
| | | Component (A) | Component (B) | Component (A) | Component (B) | solid content: 20% by weight | solid content: 41% by weight |
| Present invention product | 3-1 | A-4 | B-1 | 50 | 50 | 7 | 125 |
| | 3-2 | A-3 | B-1 | 50 | 50 | 28 | 386 |
| | 3-3 | A-5 | B-1 | 50 | 50 | 48 | 1389 |
| | 3-4 | A-6 | B-1 | 50 | 50 | 133 | 2000 or larger |
| | 3-5 | A-4 | B-1 | 1 | 99 | 5 | 99 |
| | 3-6 | A-4 | B-1 | 10 | 90 | 6 | 112 |
| | 3-7 | A-4 | B-1 | 30 | 70 | 7 | 120 |
| | 3-8 | A-3 | B-1 | 1 | 99 | 5 | 101 |
| | 3-9 | A-3 | B-1 | 30 | 70 | 14 | 210 |
| | 3-10 | A-3 | B-1 | 40 | 60 | 16 | 240 |
| | 3-11 | A-5 | B-1 | 1 | 99 | 5 | 103 |
| | 3-12 | A-6 | B-1 | 1 | 99 | 5 | 104 |

Example 4

Evaluation for Appearance of a Dispersant

Aqueous dispersant solutions (solid content: 41% by weight) containing components (A) and (B) at weight ratios shown in Table 5 were placed in 100 ml screw tubes. Tubes were capped, shaken for about one minute with a hand, and allowed to stand. Solutions were visually evaluated for appearance immediately after standing and one day after at 25° C., and ranked to "A" for a homogeneous liquid without clouding, "B" for a cloudy liquid but still in a homogeneous state, or "C" for a liquid occurring separation and/or precipitation. The results are shown in Table 5. In Table 5, some ingredients not corresponding to the components (A) and (B) were shown in columns of the components (A) and (B) for convenience. "A" is preferable and "B" is secondly preferable from the points of good dispersant productivity of compositions as can be homogeneously mixed in a short time and storage stability.

TABLE 5

| | | Dispersant for hydraulic composition Compounded component | | Evaluation for appearance Immediately after standing | | | | |
|---|---|---|---|---|---|---|---|---|
| | | Component (A) | Component (B) | Weight ratio of (A)/(B) | | | | |
| | | | | (A)/(B) = 1/99 | (A)/(B) = 30/70 | (A)/(B) = 40/60 | (A)/(B) = 50/50 | (A)/(B) = 75/25 |
| Comparative product | 4-1 | PAA | B-1 | — | B | — | B | B |
| | 4-2 | a-1 | B-1 | — | B | — | B | B |
| | 4-3 | a-2 | B-1 | — | C | — | C | C |
| | 4-4 | a-3 | B-1 | — | C | — | C | C |
| | 4-5 | a-4 | B-1 | — | B | — | B | B |
| Present invention product | 4-1 | A-1 | B-1 | A | A | B | B | B |
| | 4-2 | A-2 | B-1 | A | A | A | B | B |
| | 4-3 | A-3 | B-1 | A | A | A | A | B |
| | 4-4 | A-4 | B-1 | A | A | A | A | A |

| | | | Evaluation for appearance One day after standing Weight ratio of (A)/(B) | | | | |
|---|---|---|---|---|---|---|---|
| | | | (A)/(B) = 1/99 | (A)/(B) = 30/70 | (A)/(B) = 40/60 | (A)/(B) = 50/50 | (A)/(B) = 75/25 |
| Comparative product | 4-1 | | — | A | — | C | C |
| | 4-2 | | — | C | — | C | C |
| | 4-3 | | — | C | — | C | C |
| | 4-4 | | — | C | — | C | C |
| | 4-5 | | — | C | — | C | C |
| Present invention product | 4-1 | | A | A | A | A | A |
| | 4-2 | | A | A | A | A | A |
| | 4-3 | | A | A | A | A | A |
| | 4-4 | | A | A | A | A | A |

The invention claimed is:

1. A dispersant for a hydraulic composition, comprising
(A) a polymer composed of structural units, not less than 76.4% by weight of which are derived from a monomer represented by the following formula (1):

$$H_2C{=}CHCOOCH_2CH_2OH \quad (1);$$

(B) a naphthalenesulfonic acid-formaldehyde condensate; and water, wherein a weight ratio (A)/(B) of the polymer (A) and naphthalenesulfonic acid-formaldehyde condensate (B) is 1/99 to 30/70, and the dispersant is in the form of a homogeneous solution at 25° C and contains water in an amount of 40 to 70% by weight.

2. The dispersant for a hydraulic composition according to claim 1, wherein the weight average molecular weight of the polymer (A) is 1000 to 100000.

3. The dispersant for a hydraulic composition according to claim 1 or 2, wherein the viscosity of an aqueous solution thereof containing 20% by weight of solids is not more than 60 mPa·s at 25° C.

4. The dispersant for a hydraulic composition according to claim 1, wherein the content of the polymer(A) is 0.1 to 50% by weight and the content of the naphthalenesulfonic acid-formaldehyde condensate (B) is 0.3 to 50% by weight.

5. The dispersant for a hydraulic composition according to claim 1, wherein the total amount of the polymer(A) and the naphthalenesulfonic acid-formaldehyde condensate(B) in the dispersant for a hydraulic composition is 30 to 60% by weight.

6. The dispersant for a hydraulic composition according to claim 1, wherein the polymer(A) is composed of structural units contains is composed of structural units ,not less than 88.7% by weight of which are derived from a monomer represented by the following formula (1):

$$H_2C=CHCOOCH_2CH_2OH \qquad (1).$$

7. A dispersant for a hydraulic composition, comprising:

(A) a polymer composed of structural units, not less then 76.4% by weight of which are derived from a monomer represented by the following formula (1):

$$H_2C=CHCOOCH_2CH_2OH \qquad (1);$$

(B) a naphthalenesulfonic acid-dormaldehyde condensate; and water, wherein a weight ratio (A)/(B) of the polymer (A) and the naphthalenesulfonic acid-formaldehyde condensate (B) is 1/99 to 15.4/84.6, the dispersant is in the form of a homogeneous solution at 25°C. and contains water in an amount of 40 to 70% by weight.

8. A method for enchancing dispersibility of a hydraulic powder, comprising:

adding the dispersant for a hydraulic composition according to claim 1 to a composition comprising the hydraulic powder and water to enhance dispersibility of the hydraulic powder in the composition.

9. A hydraulic composition, comprising the dispersant for a hydraulic composition according to claim 1 or 2, a hydraulic powder and water.

\* \* \* \* \*